(12) United States Patent
Kudo et al.

(10) Patent No.: US 6,381,695 B2
(45) Date of Patent: *Apr. 30, 2002

(54) ENCRYPTION SYSTEM WITH TIME-DEPENDENT DECRYPTION

(75) Inventors: Michiharu Kudo, Kamakura; Masayuki Numao, Kawasaki; Hiroshi Kawazoe, Yokohama, all of (JP)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/115,422

(22) Filed: Jul. 14, 1998

(30) Foreign Application Priority Data

Aug. 22, 1997 (JP) .............................. 9-226903
Nov. 25, 1997 (JP) .............................. 9-322825

(51) Int. Cl.$^7$ ........................... H04L 9/00; G06F 12/14
(52) U.S. Cl. ....................... 713/156; 380/279
(58) Field of Search ................ 380/279, 282, 380/286, 45; 713/155, 156, 158

(56) References Cited

U.S. PATENT DOCUMENTS

| | | | | |
|---|---|---|---|---|
| 5,633,928 A | * | 5/1997 | Lenstra et al. ............... | 380/286 |
| 5,671,276 A | * | 9/1997 | Eyer et al. .................... | 380/231 |
| 5,701,828 A | * | 12/1997 | Benore et al. ................. | 109/56 |
| 5,768,379 A | * | 6/1998 | Girault et al. ............... | 713/185 |
| 5,852,665 A | * | 12/1998 | Gressel et al. ................ | 380/30 |
| 6,047,265 A | * | 4/2000 | Sugimori ..................... | 705/26 |
| 6,072,402 A | * | 6/2000 | Kniffin et al. ......... | 340/825.31 |

OTHER PUBLICATIONS

Schneier, Bruce. "Applied Cryptography, Second Edition." John Wiley and Sons. CIP 1995. pp. 185–187.*

* cited by examiner

Primary Examiner—Gail Hayes
Assistant Examiner—Anthony DiLorenzo
(74) Attorney, Agent, or Firm—Thomas A. Beck; Louis P. Herzberg (57) ABSTRACT

An object of the invention is to provide an encryption system and method for inhibiting the decryption of encrypted data unless a decryption condition is satisfied. Thus, according to the present invention, in order to provide the encryption system for inhibiting the decryption of encrypted data unless a decryption condition is satisfied, decryption enabled time is designated as a decryption condition, and an encryption system incorporating time-dependent decryption is constituted by a time-key certificate and a time-key certificate manager. A time-key certificate is employed when a third party proves that a public encryption key added to the certificate satisfies the decryption condition. The time-key certificate manager issues a time-key certificate and then manages a decryption key.

14 Claims, 5 Drawing Sheets

ENCRYPTION SYSTEM WITH TIME-DEPENDENT DECRYPTION

FIELD OF THE INVENTION

The present invention is directed to the field of encryption. It is more specifically directed to an encryption system.

BACKGROUND OF THE INVENTION

Background Art

An explanation will be given for a difference between the use of a general certificate and the use of a time-key certificate.

Figure 1:
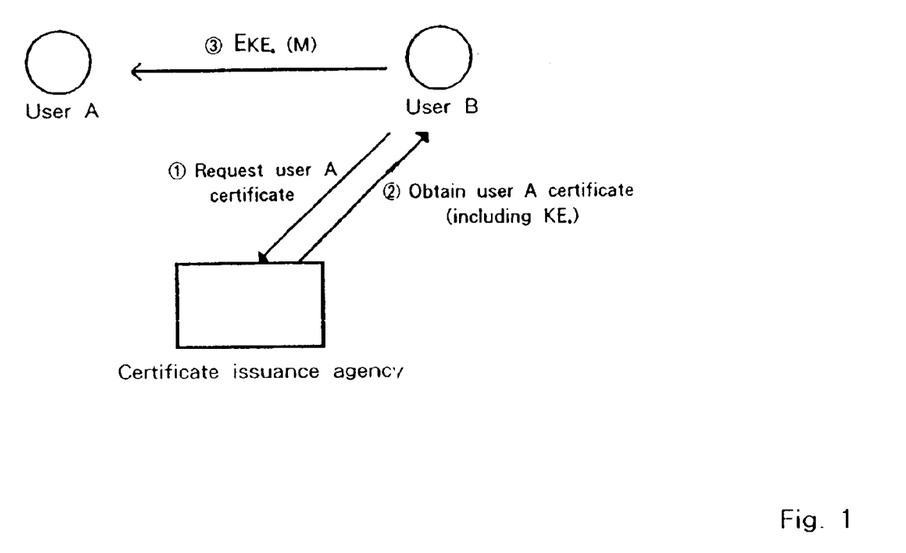
FIG. 1 is a diagram showing the use of a general certificate.

The use of a general certificate is shown in FIG. 1. When user B desires to encrypt data (M) and to transmit the encrypted data to user A, user B requests that a certification authority issue a certificate for user A. This certificate includes the name of user A and a public encryption key (KEa) for user A, and also the digital signature of the certification authority for all the contents. User B obtains the certificate for user A and confirms that the certification authority has provided the digital signature for the public encryption key for user A. If the digital signature is correct, user B encrypts the target message M by using the public encryption key (KEa) for user A, and transmits the encrypted message to user A.

The general certificate is used to obtain a certain guarantee for a public encryption key for a partner ("Applied Cryptography," Bruce Schneier, John Wiley & Suns, Inc., pp. 185–187, 1996), i.e., to provide a guarantee that no person other than user A can decrypt the encrypted data. However, a condition for limiting the time during which user A can decrypt data can not be added to the general certificate.

One example certificate that includes an encryption key and time is the Kerberos system ("Computer Network Encryption System," Toyohiko Kikuchi, NEC Creative, pp. 57–68, 1995). A server use permission certificate includes an encryption key, which is used for encrypting data exchanged between a client machine and a key authority, and values for "current time" and "valid time."

While the encryption key in the Kerberos system includes the subject for encrypting data that are being exchanged, an encryption key of the present invention includes the subject for inhibiting decryption at times other than a decryption time. Thus, the purposes of the keys differ. Furthermore, while the Kerberos system employs a symmetric key called DES, the present invention employs an asymmetric key.

In the Kerberos system, a server use permission certificate includes a "current time" and a "valid time."The valid time for the issued server use permission certificate is designated to prevent the reading of a key. The valid time for present invention, however, doesn't define time for enabling the decryption of data that was encrypted using a public encryption key included in the certificate.

In ISO X. 400 MHS (http://www.iso.ch/), instruction identifier "Deferred delivery" is defined as an identifier for designating a mail delivery time. This is a description method for designating a time at which mail is to be delivered to an addressee. The identifier includes only a delivery time for a destination, and does not include a time for decrypting encrypted data. With this method, a time for decryption can not be designated in the certificate.

The UNIX system has a timed daemon program that synchronizes clocks at different workstations. This program communicates with a timed daemon program that is operating in another computer on the same LAN, and adjusts and synchronizes both clocks. However, since a daemon program merely adjust clocks, it differs from the time-key certificate manager of the present invention.

Then, there is a communication protocol called a network time protocol (NTP) that synchronizes clocks at workstations that are not linked together by a LAN ("Building Internet Firewalls," D. B. Chapman and E. D. Zwicky, pp. 321 to 324, O'Reilly & Associates, Inc., 1995). According to this protocol, a time broadcast is received, and a time server that constantly maintains the clock of a system is employed to adjust the clock of another system on the Internet to which that system is connected. Therefore, with this method, a time for enabling decryption of encrypted data can not be designated.

And there is a Secure Time-stamping technique that employs a hash value for a digital document to prove that a document existed at a specific time ("How To Time-Stamp A Digital Document," S. Haber and W. S. Stornetta, Advances in Cryptology-CRYPTO '90Proceedings, Springer-Verlag, pp. 437 to 455, 1991). According to this technique, when a hash value for a digital document is transmitted to a system that provides the Secure Time-stamping service, based on matching of the time-stamping hash value calculated by the system, it can be proved that the document existed at a specific time. However, this technique does not teach a method for designating a time for enabling decryption of encrypted data.

[Problems to be Solved by the Invention]

It is, therefore, one object of the present invention to provide an encryption system and method for inhibiting the decryption of encrypted data unless a decryption condition is satisfied.

It is another object of the present invention to provide a disclosure time designation file transfer system.

It is an additional object of the present invention to provide a data library system with a disclosure time control function.

It is a further object of the present invention to provide a method and a system for controlling disclosure time.

It is yet another object of the present invention to provide a configuration for a time-key certificate and a time-key certificate manager.

It is yet an additional object of the present invention to provide a method for preventing the alteration of data or wiretapping during the communication process even when data is encrypted in the same manner as for normal encryption.

It is yet a further object of the present invention to provide an encryption system and method for which an ID or a password, used for an electronic safe system that satisfies a decryption condition, need not be distributed to a person performing the decryption.

SUMMARY OF THE INVENTION

In order to provide an encryption system for inhibiting decryption of encrypted data unless conditions for decryption are met, an encryption system with time-dependent decryption is constructed that has a time-key certificate manager for issuing a time-key certificate to guarantee that a time for enabling decryption of information is limited.

Figure 2:
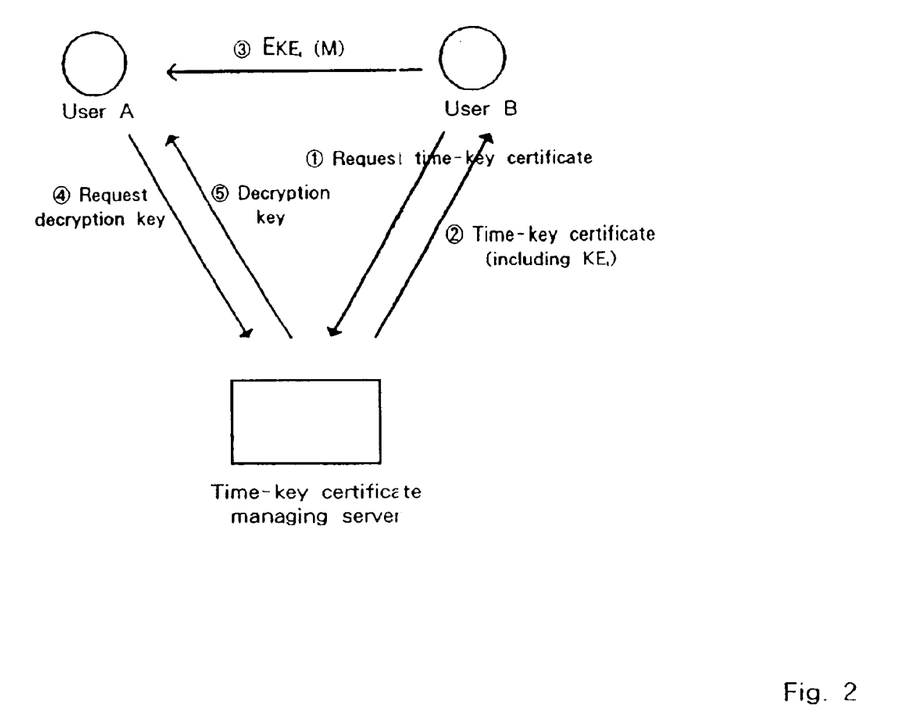
FIG. 2 is a diagram showing the use of a time-key certificate.

An encryption system according to the present invention is shown in FIG. 2. User B requests that a time-key certificate manager (hereinafter referred to simply as a time-key manager) issue a time-key certificate, including disclosure time information, and acquires it. Data to be transmitted to user A are encrypted by using a public key for encryption (KEt) included in the time-key certificate, and the encrypted data are transmitted. User A requests a decryption key from the time-key manager to decrypt the data received from user B. When the current time meets the decryption conditions, the decryption key is transmitted to user A, who can use it to decrypt the data.

As is described above, when the time-key certificate and the time-key manager are employed, the time during which a third party can acquire a decryption key for decrypting encrypted data can be limited.

In addition, the third party employs a time-key certificate to examine the public key for encryption included in a time-key certificate to determine whether or not it satisfies the decryption conditions. The time-key manager issues a time-key certificate and then manages a decryption key.

With this arrangement, a user encrypts data using his or her machine. And when the user acquires a time-key certificate, he or she can encrypt data in the same manner as for normal encryption by using a public encryption key included in the time-key certificate. As a result, it is possible to provide a system that ensures a high level of security and that, during the communication process, can prevent the alteration of data or wiretapping, which can occur when an external service is employed for encryption.

Furthermore, when the correct signature of the time-key certificate manager is included in the time-key certificate, the user performing the encryption can trust the decryption condition service provided by the time-key certificate manager that issued the time-key certificate or by a person in charge of the server, so that an ID or a password used for an electronic safe system that satisfies a decryption condition need not be distributed to a person performing the decryption.

BRIEF DESCRIPTION OF THE DRAWINGS

These and other objects, features, and advantages of the present invention will become apparent upon further consideration of the following detailed description of the invention when read in conjunction with the drawing figures, in which.

DETAILED DESCRIPTION OF THE INVENTION

Preferred Embodiment

Figure 5:
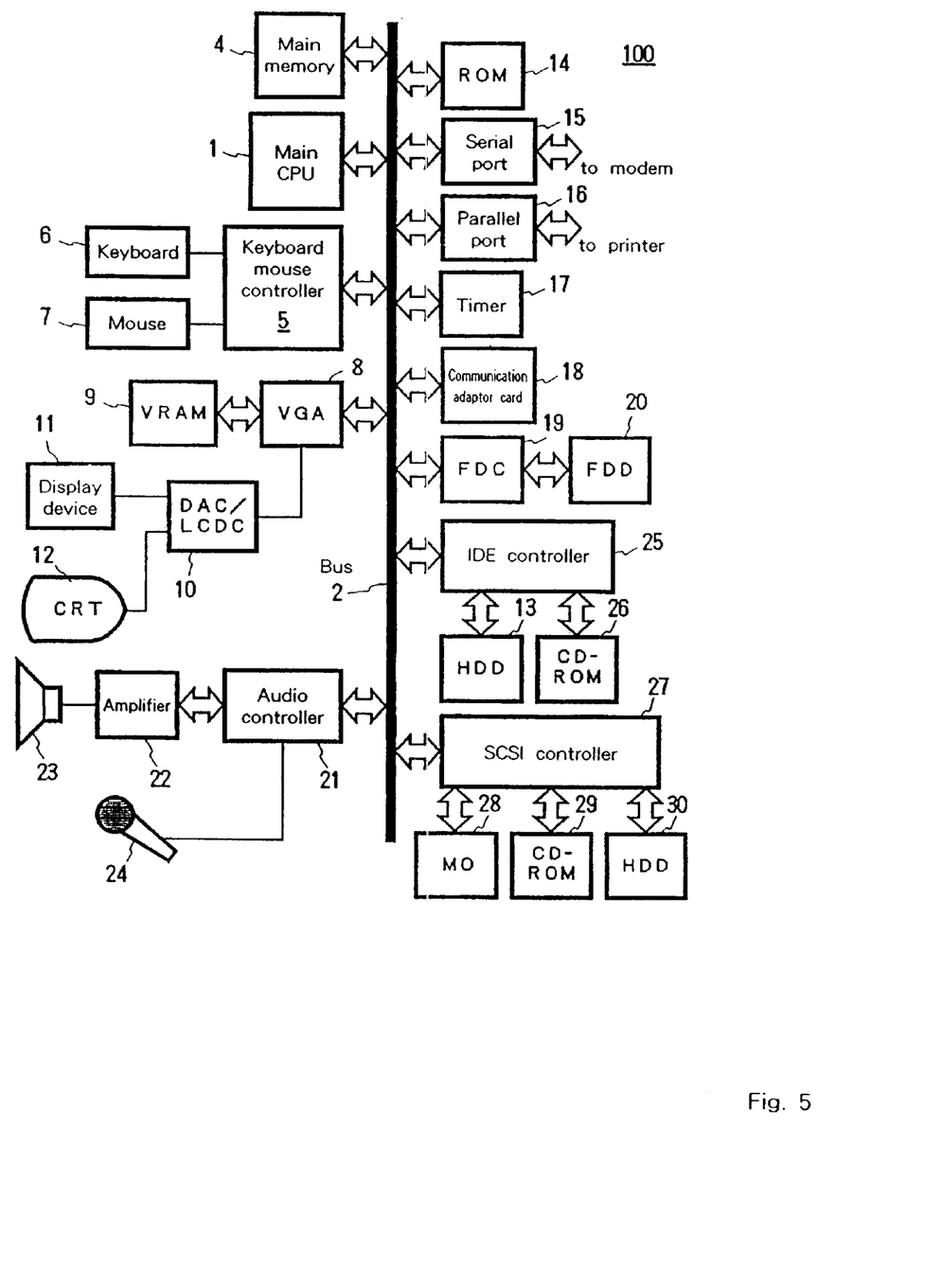
FIG. 5 is a schematic diagram illustrating an example hardware arrangement for a system according to the present invention.

The preferred embodiment of the present invention will now be described while referring to the drawings. FIG. 5 is a schematic diagram illustrating an example hardware arrangement for a system according to the present invention. A system 100 includes a central processing unit (CPU) 1 and a memory 4. The CPU 1 and the memory 4 communicate across a bus 2 with a hard disk drive 13, which is an auxiliary storage device. A floppy disk drive (or a memory medium driver for an MO or a CD-ROM) 20 is connected to the bus 2 via a floppy disk controller 19.

A floppy disk (or a memory medium for an MO or a CD-ROM) is inserted into the floppy disk drive (or a memory medium driver for an MO or a CD-ROM) 20. Code for a computer program for accomplishing the present invention can be recorded on the floppy disk or the hard disk drive 13, or in a ROM 14. The computer program, which interacts with an operating system to issue commands to the CPU 1, is loaded into the memory 4 for execution. The code for the computer program can be compressed, or can be divided into a plurality of segments to be recorded on a plurality of memory media.

The system 100 further includes user interface hardware components, such as a pointing device (a mouse, a joystick, etc.) 7 or a keyboard 6, and a display 12 for providing visual data for a user. Furthermore, a printer and a modem can respectively be connected via a parallel port 16 and a serial port 15. The system 100 can be connected to a network through the serial port 15 and a modem, or through a communication adaptor card (ethernet or a token ring) 18 for communication with other computers.

An audio controller 21 performs D/A (digital/analog) conversion of an audio signal, and the converted signal is transmitted to an amplifier 22 for release sound through a loudspeaker 23. The audio controller 21 also performs A/D (analog/digital) conversion of audio information received at a microphone 24, and obtains external audio information for the system 100.

As is described above, it would be easily understood that the encryption system of the present invention can be accomplished by an ordinary personal computer (PC) or workstation; a notebook PC; a palmtop PC; a network computer; an electric home appliance, such as a television incorporating a computer; a game machine having a communication function; a communication terminal having a communication function, such as a home telephone, a facsimile machine, a portable telephone, a PHS terminal or an electronic notebook; or a combination of such devices. The above described components are merely examples, and not all the components are required for the present invention.

According to the present invention, in order to provide an encryption system for inhibiting the decryption of encrypted data unless a decryption condition is satisfied, a decryption enabled time is a designated decryption condition. The encryption system with time-dependent decryption is constituted by a time-key certificate and a time-key certificate manager. The time-key certificate is employed when a third party proves that an public encryption key added to the certificate satisfies the decryption condition. The time-key certificate manager issues the time-key certificate and then manages a decryption key. The disclosure time designation file transfer system and the data library system having a disclosure time control function will now be described as embodiments of the encryption system with time-dependent decryption.

First, the disclosure time designation file transfer system will be explained. When a user provides information, he or she believes that the information should be disclosed at a specific time. As an example, information for personnel changes should not be disclosed before the date on which it is to be employed.

When the present invention is employed in this case, upon the receipt of a request from a user, information for which access is inhibited until a disclosure time is reached can be encrypted by using a time-key, and the encrypted data can be transmitted to the user before the date on which it is employed.

The processing performed by the system will now be explained while referring to FIG. 3.

(1) An information user requests information from an information server.

(2) The information server requests that a time-key manager issue a time-key certificate.

(3) The time-key manager transmits a time-key certificate to the information server.

(4) The information server transmits to the information user those data, including information M, obtained by encrypting the time-key certificate using a public key.

(5) The information user requests that the time-key manager issue a decryption key.

(6) The time-key manager transmits a decryption key to the information user after the disclosure time has been reached.

(7) The information user decrypts encrypted information M using the decryption key, and acquires the desired information M.

Next, a data library system having a disclosure time control function will be explained.

A system for providing to many users data that are acquired from a plurality of information servers is called a data library system. In this embodiment, the data library system receives data from information servers and stores them in a database, and transmits data to requesters when the requesters are users having system memberships. Consider a case where, for example, a cameraman desires to open an exclusive photograph on the data library system at a specific date, for example since Jan. 1, 1998, but the system has no control function for a disclosure time.

A data library system having a disclosure time control function could be applied in such a case. The processing will now be described while referring to FIG. 4.

Figure 4:
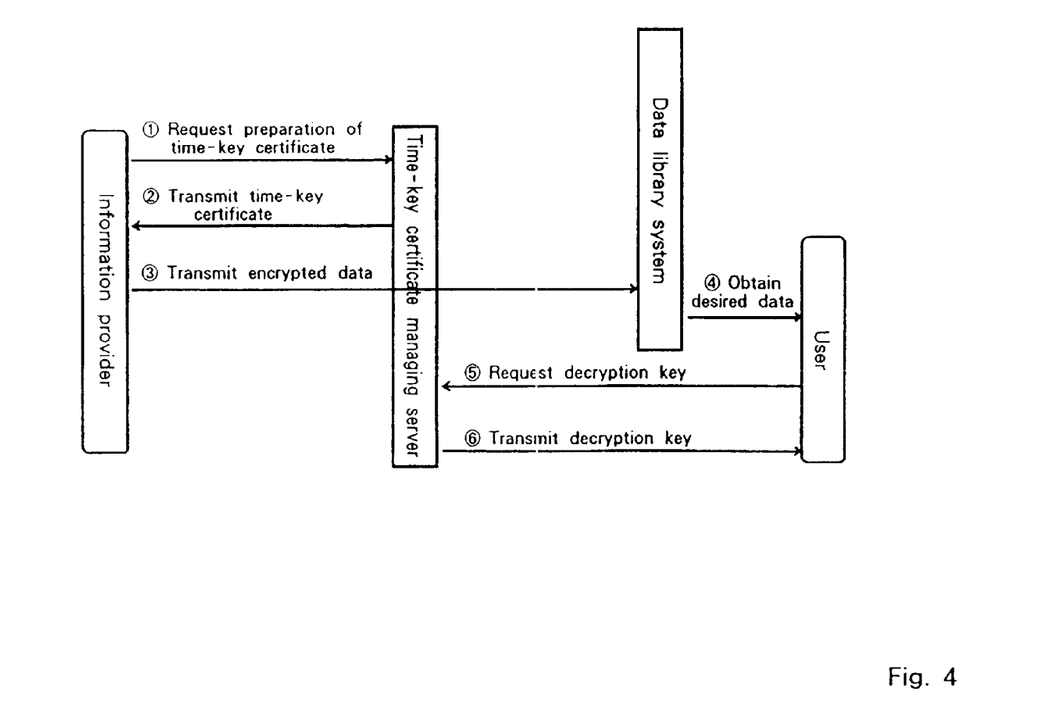
FIG. 4 is a diagram illustrating one embodiment of data library system having a disclosure date control function.

(1) An information server designates a data discloser period as a decryption condition. For example, the information server requests that a time-key certificate manager issue a time-key certificate that designates Jan. 1, 1998, as the data disclosure date.

(2) The information server acquires the time-key certificate and encrypts the data by using a public encryption key.

(3) The information server transmits the encrypted data to the data library system.

(4) A user accesses the data library system and acquires the desired encrypted data.

(5) The user accesses the time-key certificate manager to request a decryption key.

(6) The time-key certificate manager compares the current time with the decryption enabled time contained in the time-key certificate. When the current time satisfies the decryption condition, the time-key certificate manager transmits the decryption key to the user; but when the current time does not satisfy the condition, the time-key certificate manager does not transmit the decryption key. Upon the receipt of the decryption key, the user employs it to decrypt the encrypted data received from the data library system and obtains the desired data.

Figure 6:
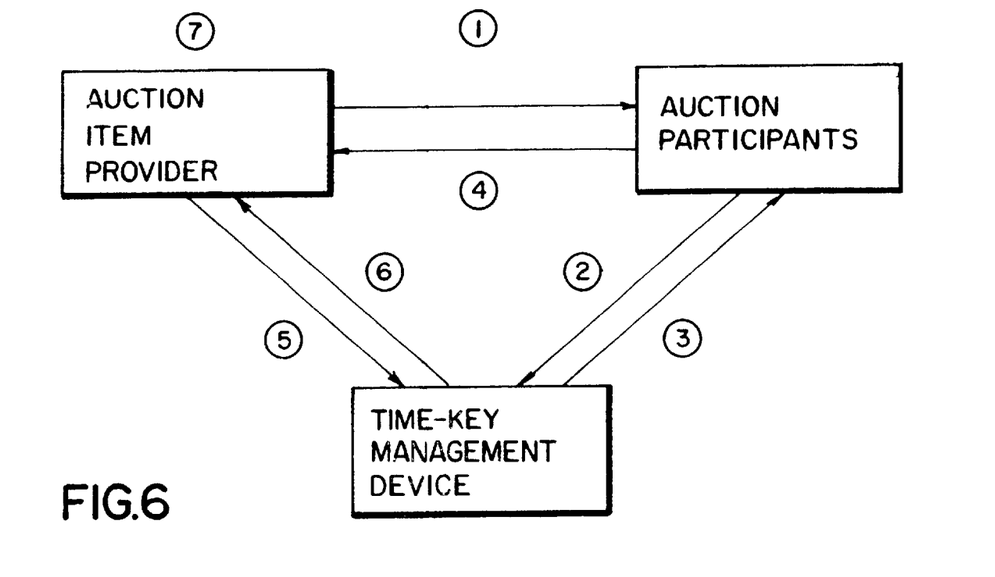
FIG. 6 is a diagram for an embodiment of a tendering system with a disclosure time function.

The disclosure time designation file transfer system (FIG. 3), wherein the information user is replaced by an order submitter and the information server is replaced by an order receiver, can be employed as an electronic tendering system (FIG. 6). Upon receipt of a request from an order receiver, the time-key manager transmits a time-key certificate that includes disclosure time information and a public key for encryption. The order receiver transmits to an order submitter tender information that is encrypted using the public key in the time-key certificate. Then, upon the receipt of a request from the order submitter for a decryption key, the time-key manager transmits a decryption key to the order submitter after the disclosure time has been reached. An electronic tendering system can therefore be provided that guarantees that a time for enabling decryption of tender information is limited. In this case, when tender types differ, a paired public key and secret key differ accordingly.

Figure 7:
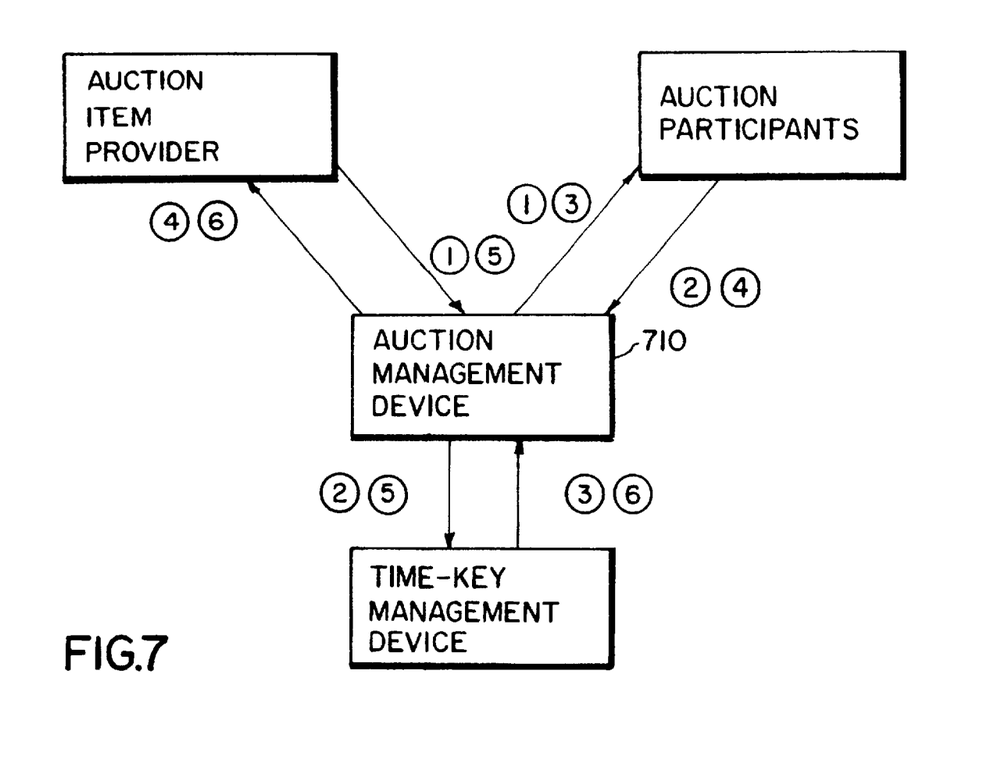
FIG. 7 is a diagram for another embodiment of a tendering system with a disclosure time function.

In the electronic tendering system in FIG. 6, when direct communications among the order submitter, the order receiver and the time-key manager are to be avoided, only a special tender manager 710 need be provided for transmitting communications for the order submitter, the order receiver and the time-key manager (FIG. 7). In other words, the tender manager exchanges messages with the order submitter, the order receiver, and the time-key manager. First, upon receipt of a request from an order receiver, the tender manager 710 obtains from the time-key manager a time-key certificate that includes time disclosure information and a public key for encryption, and transmits the time-key certificate to the order receiver. Then, the tender manager 710 receives tender information, which is encrypted by the order receiver using the public key in the time-key certificate. Upon the receipt of a request from the order submitter, the tender manager 710 acquires a decryption key from the time-key manager after the disclosure time has been reached, and transmits the decryption key to the order submitter.

Figure 3:
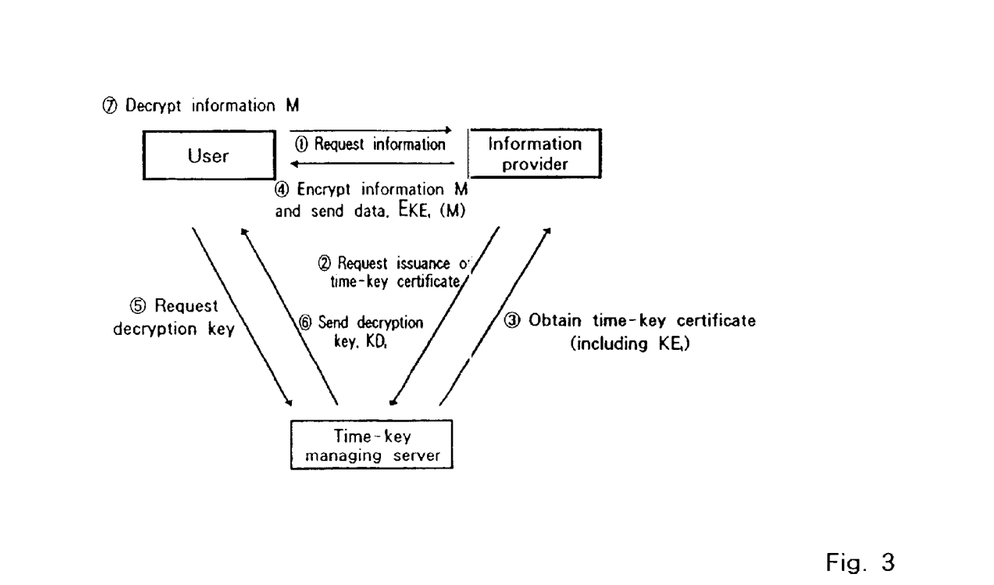
FIG. 3 is a diagram illustrating one embodiment of a disclosure time designation file transfer system.
Figure 8:
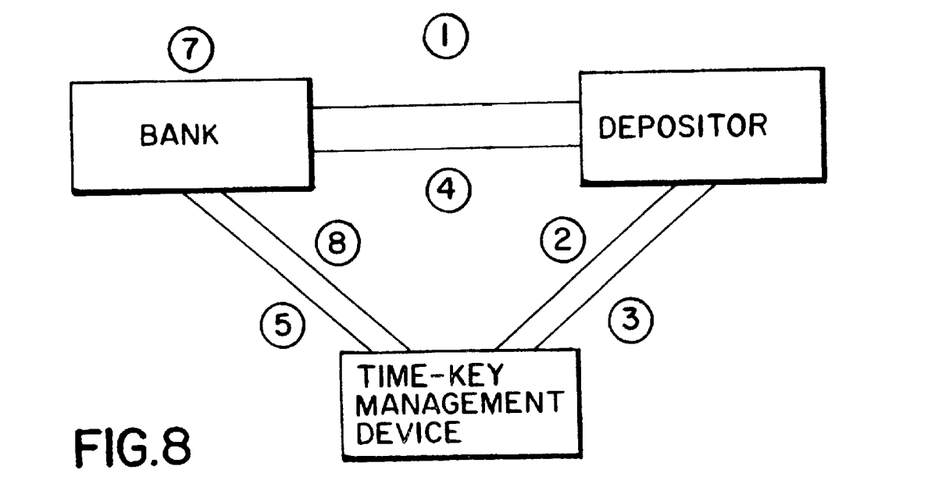
FIG. 8 is a diagram for an embodiment of an electronic safe stem with a disclosure time function.

When the information user in FIG. 3 is replaced by a bank and the information server is replaced by a depositor, the system can be used as an electronic safe system (FIG. 8). Upon the receipt of a request from a depositor, the time-key manager transmits to the depositor a time-key certificate that includes disclosure time information and a public key for encryption. The depositor electronically transmits to the bank money information that has been encrypted using the public key in the time-key certificate. Then, upon the receipt of a request from the bank for a decryption key, the time-key manager transmits a decryption key to the bank after the disclosure time has been reached. Therefore, an electronic safe system can be provided that guarantees that a time for decryption of electronic money information is limited. As safes differ, pairs of public keys and secret keys also differ.

Figure 9:
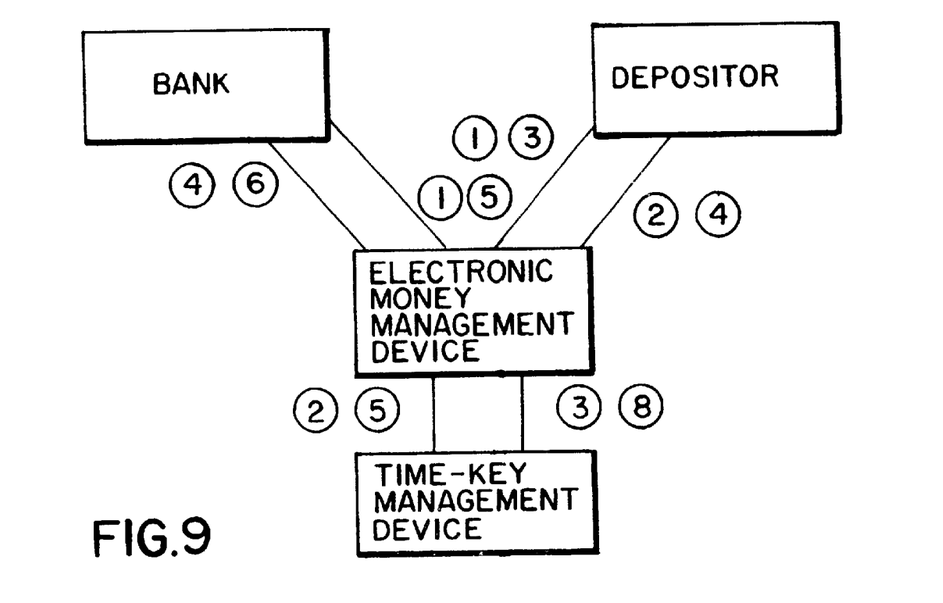
FIG. 9 is a diagram for another embodiment of an electronic safe system with a disclosure time function.

In the electronic safe system in FIG. 8, when the direct interchange of messages by the bank, the depositor and the time-key manager are to be avoided, only a special electronic money manager 910 need be provided for transmitting the messages originating at the bank, the depositor and the time-key manager (FIG. 9). First, upon receipt of a request from a depositor, the electronic money manager 910 receives from the time-key manager a time-key certificate that includes time disclosure information and a public key for encryption, and transmits the time-key certificate to the depositor. Then, the electronic money manager 910 receives electronic money information, which has been encrypted by the depositor using the public key in the time-key certificate.

Upon the receipt of a request from the bank, the electronic money manger 910 acquires a decryption key from the time-key manager after the disclosure time has been reached, and transmits the decryption key to the bank. The other embodiments can be performed within the scope of the present invention.

Advantages of the Invention

Since a user who performs encryption employs the time-key certificate of the present invention, he or she can encrypt data using his or her machine. And when the user acquires a time-key certificate, he or she can encrypt data in the same manner as for normal encryption by using a public encryption key included in the time-key certificate. As a result, the alteration of data or wiretapping during the communication process, which may occur when an external service is employed for encryption, can be prevented.

Furthermore, when the correct signature of the time-key manager is included in the time-key certificate, the user performing the encryption can trust the decryption condition service provided by the time-key manager, which issued the time-key certificate, or by a person in charge of the server, so that an ID or a password used for an electronic safe system that satisfies a decryption condition need not be distributed to a person performing decryption.

It is noted that this invention may be used for many applications. Although the description is made for particular arrangements and applications, the intent and concept of the invention is suitable and applicable to other arrangements and applications. It will be clear to those skilled in the art that other modifications to the disclosed embodiments can be effected without departing from the spirit and scope of the invention.

What is claimed is:

1. An encryption system with time-dependent decryption, including a time-key manager for guaranteeing that a time for enabling decryption of information is limited, (1) wherein upon receipt of a request from an information server, said time-key manager transmits to said information server, a time-key certificate including disclosure time and a public key for encryption and said time-key certificate including no subject information; and (2) wherein said information server transmits to an information user, information encrypted using said public key, which is included in said time-key certificate, said time-key manager, following receipt of a request from said information user for a decryption key, transmits said decryption key to said information user at such time said disclosure time has been reached; said decryption key being a private key, generated and having been kept secret from the time of generation by said time key manager.

2. A time-key manager for guaranteeing that a time for enabling decryption of information is limited, comprising:

(1) means for, upon receipt of a request from an information server, transmitting to said information user a time-key certificate including disclosure time information and a public key for encryption, said time-key certificate including no subject information; and (2) means for, after said information server transmits to an information user information encrypted using said public key, which is included in said time-key certificate, receiving a request for a decryption key from said information user, and transmitting said decryption key to said information user at such time said disclosure time has been reached; said decryption key being a private key, generated and having been kept secret from the time of generation by said time key manager.

3. A disclosure time designation file transfer system, which includes a time-key manager for guaranteeing that a time for enabling decryption of an encrypted file is limited, (1) wherein, upon receipt of a request from an information server, said time-key manager transmits to said information server, a time-key certificate including disclosure time information and a public key for encryption said time-key certificate including no subject information; and (2) wherein said information server transmits to an information user, said File encrypted using said public key, which is included in said time-key certificate, said time-key manager, following the receipt of a request for a decryption key from said information user, transmits said decryption key to said information user at such time said disclosure time has been reached, said decryption key being a private key, which has been generated and which has been kept secret since the time of generation by said time key manager.

4. An electronic tendering system, which includes a time-key manager for guaranteeing that a time for enabling decryption of tender information is limited, (1) wherein, upon receipt of a request from an order receiver, said time-key manager transmits to said order receiver a time-key certificate including disclosure time information and a public key for encryption, said time-key certificate including no subject information, and (2) wherein said order receiver transmits to an order submitter said tender information encrypted using said public key, which is included, in said time-key certificate, and said time-key manager, following the receipt of a request for a decryption key from said order submitter, transmits said decryption key to said order submitter at such time said disclosure time has been reached, said decryption key being a private key, which has been generated and which has been kept secret since the time of generation by said time key manager.

5. An electronic tendering system, which includes a time-key manager, for guaranteeing that a time for enabling decryption of tender information is limited, and a tender manager for transmitting messages exchanged by an order receiver and an order submitter, (1) wherein, upon receipt of a request from an order receiver, said tender manager acquires from said time-key manager a time-key certificate, which includes disclosure time information and a public key for encryption, said time-key certificate including no subject information, and said tender manager transmits said time-key certificate to said order receiver, (2) wherein said tender manager receives tender information that said order receiver has encrypted using said public key included in said time-key certificate; and, (3) wherein, upon receipt of a request from said order submitter, said tender manager acquires a decryption key from said time key manager after said disclosure time has been reached, and transmits said decryption key to said order submitter; said decryption key being a private key, which has been generated and which has been kept secret since the time of generation by said time key manager.

6. The system according to claim 5, wherein said public key and a secret key differ depending on tender types.

7. A tender manager for guaranteeing that a time for enabling decryption of tender information is limited comprising:

(1) means for, upon receipt of a request from an order receiver, acquiring from said time-key manager a time-key certificate, which includes disclosure time information and a public key (a) for encryption and (b) for transmitting said time key certificate to said order receiver; said time-key certificate including no subject information;

(2) means for receiving tender information that said order receiver has encrypted using said public key included in said time key certificate, and (3) means for, upon receipt of a request from said order submitter, acquiring a decryption key from said time-key manager after said disclosure time has been reached, and transmitting said decryption key to said order submitter; said decryption key being a private key, which has been generated and which has been kept secret since the time of generation by said time key manager.

8. An electronic safe system which includes a time-key manager for guaranteeing that a time for enabling decryption of electronic money information is limited, (1) wherein, upon receipt of a request from a depositor, said time-key manager transmits to said depositor a time-key certificate including disclosure time information and a public key for encryption, said time-key certificate including no subject information; and (2) wherein said depositor transmits to a bank said electronic money information encrypted using said public key, which is included in said time-key certificate, and said time-key manager, following the receipt of a request for a decryption key from said bank, transmits said decryption key to said bank after said disclosure time has been reached; said decryption key being a private key, which has been generated and which has been kept secret since the time of generation by said time key manager.

9. An electronic safe system, which includes a time-key manager for guaranteeing that a time for enabling decryption of electronic money information is limited, and an electronic money manager for transmitting messages exchanged by a depositor and a bank, (1) wherein, upon receipt of a request from at depositor, said electronic money manager acquires from said time-key manager a time-key certificate, which includes disclosure time information and a public key for encryption, but including no subject information, and transmits said time-key certificate to said depositor;

(2) wherein said electronic money manager receives electronic money information that said depositor has encrypted using said public key included in said time-key certificate, and (3) wherein, upon receipt of a request from said bank, said electronic money manager acquires a decryption key from said time-key manager after said disclosure time has been reached, and transmits said decryption key to said bank; said decryption key being a private key which has been generated and which has been kept secret since the time of generation by said time key manager.

10. The electronic safe system according to claim 9, wherein said public key and a secret key differ depending on electronic money types.

11. An electronic money manager for guaranteeing that a time for enabling decryption of electronic money information is limited, comprising:

(1) means for, upon receipt of a request from a depositor, acquiring from said time-key manager a time-key certificate, which includes disclosure time information and a public key for encryption and for transmitting said time-key certificate to said depositor, said time-key certificate including no subject information;

(2) means for receiving electronic money information that said depositor has encrypted using said public key included in said time-key certificate, and (3) means for, upon receipt of a request from said bank, acquiring a decryption key from said time-key manager after said disclosure time has been reached, and for transmitting said decryption key to said bank; said decryption key being a private key, which has been generated and which has been kept secret since the time of generation by said time key manager.

12. A data library system, which has a time-key certificate manager and a data library and which has a disclosure time control function, (1) wherein upon receipt of a request from an information server said time-key certificate manager sends to said information server a time-key certificate that includes disclosure time information and a public key for encryption, said time key certificate including no subject information;

(2) wherein said data library receives from said information server encrypted data, including data that has been encrypted by employing said public key in said time-key certificate;

(3) wherein said data library transmits said encrypted data to an information user; and (4) wherein, upon receipt of a request from said information user, said time-key certificate manager compares a current time with a time for enabling decryption of said time-key certificate and transmits a decryption key to said information user when said current time satisfies a condition for decryption or does not transmit said decryption key when said current time does not satisfy said condition for decryption; said decryption key being a private key, which has been generated and which has been kept secret since the time of generation by said time key manager.

13. A time-key management method for guaranteeing that a time for enabling decryption of information is limited, comprising the steps of:

(1) upon receipt of a request from an information server, transmitting to an information user a time-key certificate including disclosure time information and a public key for encryption, said time-key certificate including no subject information, and (2) after said information server transmits to said information user information encrypted using said public key, which is included in said time-key certificate receiving a request for a decryption key from said information user and transmitting said decryption key to said information user after said disclosure time has been reached, said decryption key being a private key, which has been generated and which has been kept secret since the time of generation by said time key manager.

14. A storage medium for storing a program for performing time-key management to guarantee that a time for enabling decryption of information is limited, said program comprising:

(1) a function for, upon receipt of a request from an information server, transmitting to an information user a time-key certificate including disclosure time information and a public key for encryption, said time-key certificate including no subject information; and (2) a function for, after said information server transmits to said information user information encrypted using said public key, which is included in said time-key certificate, receiving a request for a decryption key from said information user and for transmitting said decryption key to said information user after said disclosure time has been reached; said decryption key being a private key, which has been generated and which has been kept secret since the time of generation by said time key manager.

* * * * *